United States Patent
Burgers

[11] Patent Number: 5,823,068
[45] Date of Patent: Oct. 20, 1998

[54] ROTATING SYSTEM WITH REDUCED TRANSFERENCE OF VIBRATION AND ACOUSTICS AND METHOD FOR REDUCING SAME

[75] Inventor: Phillip Burgers, San Diego, Calif.

[73] Assignee: Comair Rotron, Inc., San Ysidro, Calif.

[21] Appl. No.: 703,652

[22] Filed: Aug. 27, 1996

[51] Int. Cl.[6] .............................. F16F 15/10; G05G 1/00
[52] U.S. Cl. ........................... 74/574; 74/572; 74/573 R
[58] Field of Search ....................................... 74/572–574

[56] References Cited

U.S. PATENT DOCUMENTS

| | | | |
|---|---|---|---|
| 1,094,589 | 4/1914 | Poland . | |
| 1,750,016 | 3/1930 | Meyer . | |
| 2,217,351 | 10/1940 | Soderquist | 74/572 X |
| 2,350,218 | 5/1944 | Remer | 74/572 X |
| 2,647,591 | 8/1953 | Young | 188/1 |
| 2,661,620 | 12/1953 | Young | 68/23 |
| 2,693,098 | 11/1954 | Young | 68/23 |
| 2,716,356 | 8/1955 | Wiedemann | 74/572 |
| 2,748,945 | 6/1956 | Lodge | 210/72 |
| 2,827,229 | 3/1958 | Blum | 233/23 |
| 3,692,236 | 9/1972 | Livshitz et al. | 233/26 |
| 3,922,891 | 12/1975 | Sundstrom, Jr. | 68/23.3 |
| 3,952,557 | 4/1976 | Bochan | 68/23.3 |
| 3,958,433 | 5/1976 | Bochan | 68/23.3 |
| 4,030,371 | 6/1977 | Bulman et al. | 74/572 X |
| 4,150,588 | 4/1979 | Brewer | 74/574 |
| 4,900,298 | 2/1990 | Langley | 494/82 |

FOREIGN PATENT DOCUMENTS

| | | | |
|---|---|---|---|
| 88/04364 | 6/1988 | WIPO | 74/572 |

*Primary Examiner*—Vinh T. Luong
*Attorney, Agent, or Firm*—Bromberg & Sunstein LLP

[57] ABSTRACT

A rotating system having reduced transference of structure-borne vibration to the chassis and a reduced level of offensive acoustics resulting from the vibration of the chassis. The system includes a chassis, a motor disposed within the chassis, a shaft attached at one end to the motor, and a rotary body coupled to a remaining end of the shaft. The motor, the shaft, and the rotary body collectively define a rotary unit, which includes a pivot point proximate to which a mount is positioned to minimize the transference of structure-borne vibration from the motor to chassis.

12 Claims, 6 Drawing Sheets

ROTATING SYSTEM WITH REDUCED TRANSFERENCE OF VIBRATION AND ACOUSTICS AND METHOD FOR REDUCING SAME

TECHNICAL FIELD

This invention relates generally to rotating systems, and more particularly, to rotating systems with reduced transference of structure-borne vibration to the chassis and reduced occurrence of offensive acoustics produced therefrom.

BACKGROUND ART

Rotating systems similar to a centrifuge typically comprise a housing (i.e., a chassis), a motor disposed within the chassis, a shaft axially attached at one end to a rotor within the motor such that the shaft is rotatably disposed about a longitudinal axis, and an external rotary body attached to the other end of the shaft. The motor, the shaft, and the rotary body collectively may be referred to as the rotary unit.

In FIG. 1, there is shown a prior art rotating system 10, similar to, for instance, a centrifuge. The rotating system 10 includes, among other things, a shaft 12, a motor 14 attached to one end of the shaft 12 and for rotating the shaft about a longitudinal axis 11, and a rotary body 16, connected to an opposite end of the shaft 12. The prior art rotating system 10 may also include a chassis 18. As can be seen in FIG. 1, although only the motor 14 is shown within chassis 18, the chassis 18 may be designed to accommodate the shaft 12 as well as the rotary body 16. To prevent the motor 14 from moving within the chassis 18 during rotation, prior art rotating systems have employed a variety of designs and mechanisms to secure the motor 14 to the chassis 18. One approach, as illustrated in FIG. 1, is to provide mounting means 19 between a top end of the motor 14 and a top side of the chassis 18.

Generally, when the rotary unit of a rotating system has a perfectly balanced rotor, there is substantially no vibratory motion within the rotating system when the unit is rotating. This is because in a perfectly balanced rotary unit, the axis of rotation of the rotary unit coincides with the unit's geometric longitudinal axis and principal axis of inertia. In contrast, when there is an unbalance in the weight distribution within rotary body, even to a small degree, the principal axis of inertia of the rotary unit is displaced laterally or is rotated with respect to the geometric longitudinal axis. When the axis of rotation does not coincide with the principal axis of inertia, the system gives rise to structure-borne vibration within the rotating system. In many instances, it is not uncommon for the vibration to be transferred from the rotary body, down the shaft, to the motor, and ultimately to the chassis. In the presence of a vibrating chassis, offensive acoustics are often produced.

At present, there are several mechanisms available for reducing structure-borne vibration in an unbalanced rotating system. Mechanisms such as those disclosed in U.S. Pat. Nos. 1,094,589 (Poland), 1,750,016 (Meyer), 2,647,591 (Young), 2,661,620 (Young), 2,693,098 (Young), 2,716,356 (Wiedemann), 2,748,945 (Lodge), 2,827,229 (Blum), 3,692,236 (Livshitz et al.), and 3,958,433 (Bochan) include dampening means between the motor and the chassis. These dampening means, however, are designed only to reduce the vibration of the rotary unit of the respective rotating system. The dampening means are not designed to be situated at a pivot point (i.e., a point about which the rotary unit, when floating freely in one location in space, naturally pivots) of the rotary unit, and hence can neither minimize the transference of vibration from the rotary unit to the chassis nor reduce the occurrence of offensive acoustics produced from the vibrating chassis. By way of example, in the patents to Young, dampening means which utilize spring-biased mechanisms are provided for the attachment of the motor to the chassis at a nodal point (i.e., a point at which the geometric longitudinal axis of the system and the axis of rotation intersect) of the rotating system. However, because the nodal point in a rotating system and its associated vibration often change with respect to a change in the rotational speed, the Young dampening means can only provide restraint against the vibration associated with low rotational speed. As the rotational speed of the system increases, the vibration associated with the higher rotational speed is allowed to occur unopposed. Thus, by utilizing dampening means in connection with a nodal point, at a higher rotational speed, not only does transference of structure-borne vibration to the Young chassis remain, but the occurrence of offensive acoustics may subsequently result within the Young rotating systems.

Accordingly, it is desirable to provide a rotating system and, in addition, a method that would not only minimize the amount of structure-borne vibration transferred to the chassis at any rotational speed, but would further reduce offensive acoustics produced from the structure-borne vibration transferred to the chassis.

SUMMARY OF THE INVENTION

In accordance with one embodiment of the present invention, there is provided a rotating system having, among other things, a chassis, a motor disposed within the chassis, a shaft axially attached to the motor, and a rotary body coupled to the shaft. The motor, the shaft, and the rotary body collectively define a rotary unit. The rotary unit of the present invention includes a longitudinal axis, and a pivot point in axial alignment with the motor. The pivot point, situated on the longitudinal axis of the rotary unit, is unrelated to a nodal point of a rotary unit. In particular, a pivot point is a point about which the unit naturally swings or pivots, along a plane, in a manner similar to a pendulum when the unit is floating freely in one location in space. A nodal point, in contrast, is a point of intersection between the geometric longitudinal axis of the unit and the orbiting rotational axis of the unit when the rotary unit is unbalanced. One distinct characteristic of a nodal point in an unbalanced rotary unit is that the position of the nodal point along the geometric longitudinal axis changes with respect to a change in the rotational speed of the rotary unit. The position of the pivot point, on the other hand, is stationary and is independent of the rotational speed of the rotary unit. In other words, when the rotary unit, whether unbalanced or not, causes the shaft and rotary body to rotate about the rotational axis of the unit at a high speed, a lower speed, or even when not rotating at all, the position of the pivot point along the longitudinal axis of the unit does not vary and remains at a fixed location.

The rotating system also provides, in one embodiment of the present invention, mounting means positioned between the motor and the chassis at a level substantially equal in height and proximate to the pivot point so as to minimize the amount of structure-borne vibration generally transmitted from the rotary unit to the chassis. The pivot point, in addition to being a point about which the rotary unit naturally pivots, is also a point with relatively little structure-borne vibration that can create offensive acoustics, when such structure-borne vibration is generated along the rotary unit as a result of an unbalanced rotary body. It should be appreciated that although the proximate position of the mounting means to the pivot point acts to minimize the amount of structure-borne vibration that can cause offensive acoustics when transferred from the rotary unit to the chassis, the presence of structure-borne vibration along the rotary unit may nevertheless remain as a result of an unbalanced rotor.

The location of the pivot point for rotary units, including the rotary unit of the present rotating system, is fixed, and remains at a constant distance relative to a point of intersection between the rotary body and the shaft, regardless of the rotational speed of the rotary unit. This point of intersection often coincides with a center of percussion of the rotating unit. In the present context, the center of percussion is defined as a physical origin of unbalanced forces. This physical origin may, in addition, be located at other points along the rotary unit, for example, on the shaft or on the rotor within the motor. The relative distance between the pivot point and the point intersection between the rotary body and the shaft is defined by the formula:

$$d_o = \frac{g \cdot T^2}{4 \cdot \pi^2}$$

where g is acceleration due to gravity, and T is the oscillation period (i.e., resonance period) of the rotary unit when the unit is swinging about point of intersection between the rotary body and the shaft. D. HALLIDAY & R. RESNICK, FUNDAMENTALS OF PHYSICS—PART I (Wiley & Sons, 3d ed. 1988). In the presently preferred rotating system, as with any one particular rotating system, the location of the pivot point of the rotary unit usually remains at a constant distance from the point of intersection between the rotary body and the shaft along a longitudinal axis. However, it should be appreciated that as rotary units may differ in size and shape, the location of the pivot point for one particular rotary unit may differ from that of another unit.

For the discussion which follows hereinafter, the use of the word "vibration" is with reference to a rapid cyclic motion within an unbalanced rotary unit of a rotating system caused specifically by the orbiting manner of the unbalanced rotating unit about its geometric longitudinal axis. "Oscillation", on the other hand, is used herein with reference only to T and refers to a characteristic period (i.e., resonance period) of the rotating unit when the unit swings about the point of intersection between the rotary body and the shaft. It should be appreciated that the swinging motion of the unit about the intersection of the rotary body and the shaft is only to determine T, and is not similar to the pivoting motion that is exhibited by the rotary unit about its pivot point when the unit is rotating.

DETAILED DESCRIPTION OF SPECIFIC EMBODIMENTS

Figure 1:
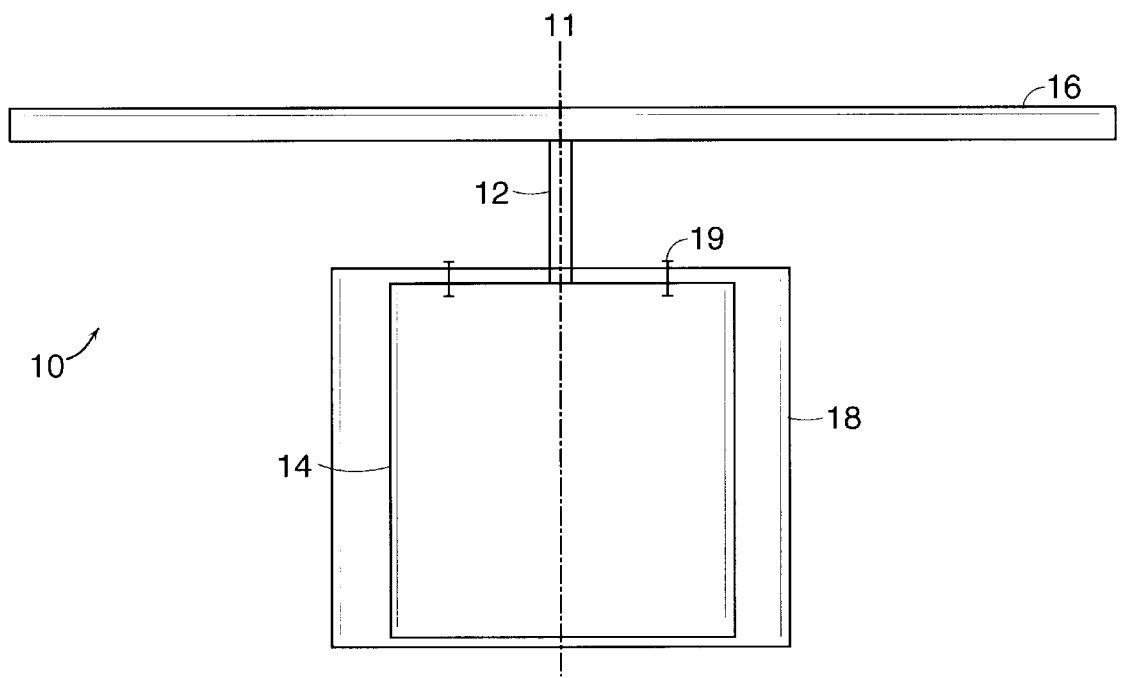
FIG. 1 illustrates a prior art rotating system wherein the motor is attached at its upper end to the chassis.

Prior art rotating systems, such as that shown in FIG. 1, typically provide mounting means 19 between a top end of the motor 14 and a top side of the chassis 18. Such a location for the mounting means, however, often results in structure-borne vibration along the rotary unit being transferred to the chassis 18 when the rotary unit is unbalanced. Upon transference of the structure-borne vibration to the chassis 18, offensive acoustics usually follows.

Figure 2:
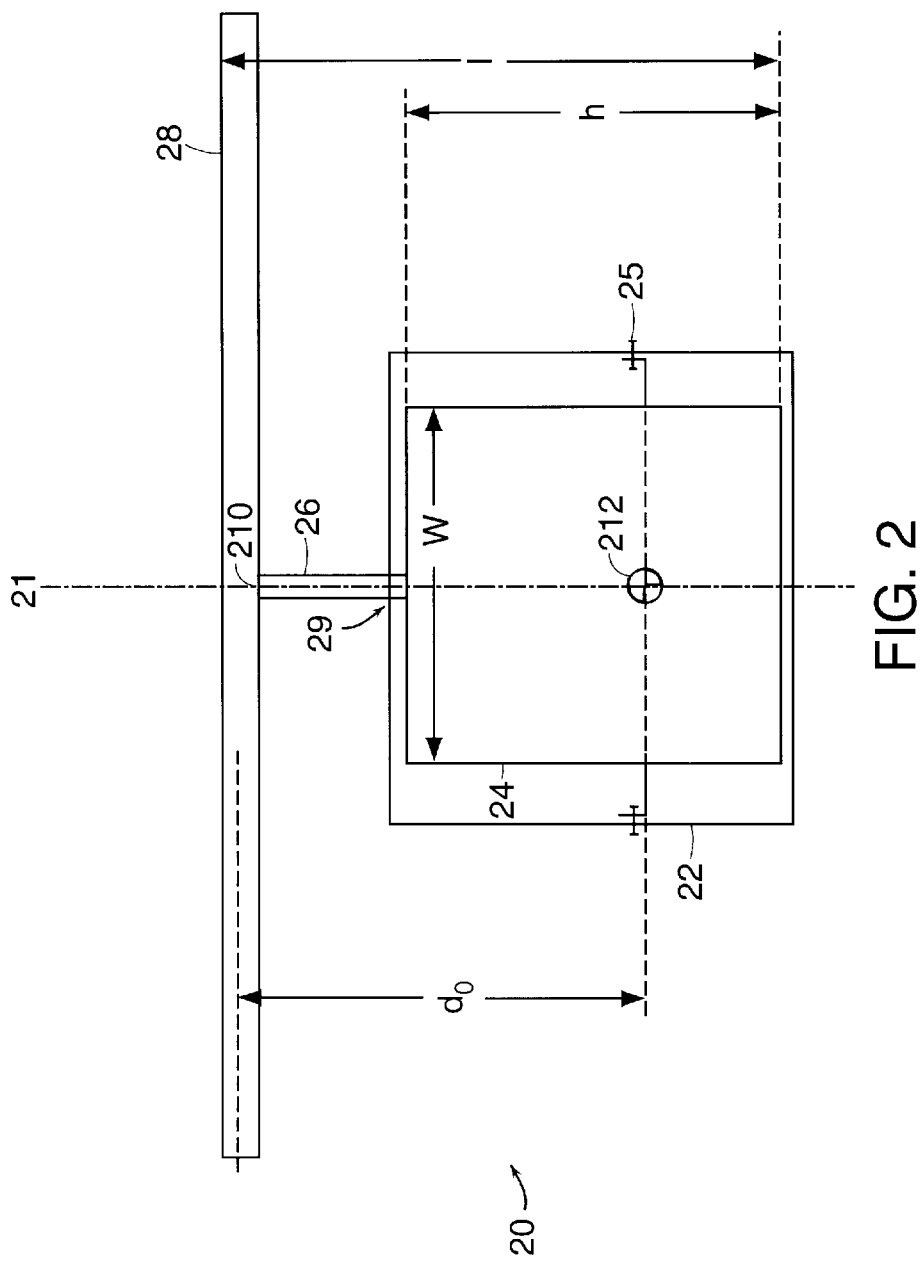
FIG. 2 shows a rotating system in accordance with one embodiment of the present invention having a motor attached to a chassis at an area proximate to a pivot point.

To minimize the amount of structure-borne vibration transmitted to a chassis and the occurrence of subsequent offensive acoustics, the present invention provides, in accordance with one embodiment, a rotating system 20 as illustrated in FIG. 2. In FIG. 2, the rotating system 20 is shown having a chassis 22, a motor 24 situated within the chassis 22 and for providing rotary motion, a shaft 26 having a longitudinal axis 21 and being connected to the motor 24, and a rotary body 28 attached to the shaft 26. The motor 24, shaft 26, and rotary body 28 collectively comprise a rotary unit 29. The motor 24 being situated within the chassis 22, is preferably concentrically aligned with the axis 21. In a preferred embodiment of the invention, the motor 24 is secured to the chassis 22 by mounting means 25 positioned at pivot point 212 to minimize the amount of structure-borne vibration that is generally transferred across the mounting means 25 to the chassis 22. Pivot point 212 is a point about which the rotary unit 29 pivots, and is also a point which exhibits relatively little structure-borne vibration, especially vibration of the type that creates offensive acoustics when transferred to the chassis. By minimizing the amount of structure-borne vibration to the chassis 28, the amount of offensive acoustics that may be subsequently produced from the chassis 22 can also be minimized. Mounting means 25, in one embodiment of the invention, is a plurality of brackets designed to maintain securely the position of the motor 24 within the chassis 22. In its position about the motor 24, each of the mounting means 25 may be evenly spaced from one another and may total 2, 3, or 4 or more in number. Of course, mounting means 25 may be any other type of fixture so long as the motor 24 is kept securely anchored within the chassis 22. The fixture may be, but is not limited to, for instance, a nut and bolt combination, or a circular member affixed about the circumference of the motor 24, and may include dampening means to further diminish the transference of vibration.

As can be seen in FIG. 2, the shaft 26 includes opposing ends and is axially attached at one end to the motor 24, such that shaft 26 is rotatably disposed about the longitudinal axis 21. A rotary body 28, adapted to carry, for example, test tubes or other similar containers, may be coupled at its midpoint to the opposite end of the shaft 26. In this manner, when shaft 26 is rotated about axis 21, the rotary body 28 may be similarly rotated. While shaft 26 is preferably disposed along longitudinal axis 21, the rotary body 28 lies within a plane (not shown) that is transverse relative to the axis 21 along which shaft 26 is positioned. Where the plane and the axis 21 intersect, a point 210 is defined.

Figure 2B:
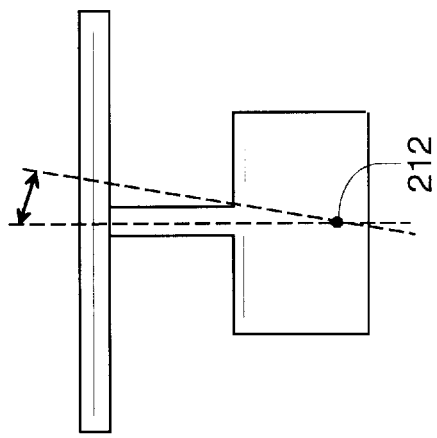
FIG. 2B illustrate a rotary unit pivoting about its pivot point.
Figure 2A:
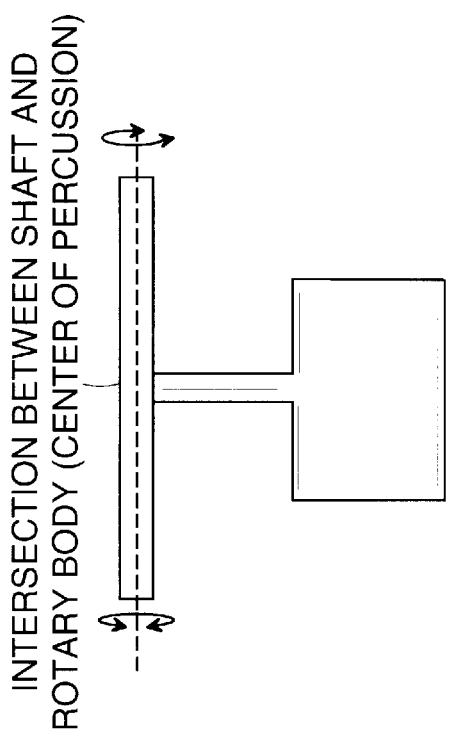
FIG. 2A illustrates a rotary unit swinging about a point of intersection between the rotary body and the shaft for calculating the oscillation period of the unit.

In the present rotating system 20, the pivot point 212 is located at a relative distance do from the point 210. This distance do is defined by the formula:

$$d_o = \frac{g \cdot T^2}{4 \cdot \pi^2}$$

where g, a constant, is the acceleration due to gravity at 32.2 ft/sec$^2$, and T, a variable, is the oscillation period (i.e., resonance period) of the rotary unit when the unit is allowed to swing about the intersection between the rotary body and the shaft. The oscillation period is generally represented by the formula 1/F, where F is the frequency or the number of swinging cycles the rotary unit exhibits over a period of time, for instance, one minute. It should be noted that allowing the rotary unit to swing about the intersection between the rotary body and the shaft, in the manner shown in FIG. 2A, is done without allowing the unit to rotate, and is only to determine the value for T (a discussion of which is provided hereinafter in detail). Moreover, this swinging motion is not the pivoting motion that is exhibited by the rotary unit about its pivot point (FIG. 2B) when the unit is rotating.

In one embodiment of the present invention where, as illustrated in FIG. 2, the distance 1 from the bottom of motor 24 to the rotary body 28 is about 3.38 inches, and the motor 24 has a height h of about 2.3 inches and a width w of about 2.5 inches, the frequency F has been determined to be approximately 117 cycles per 60 seconds. The frequency F can be determined by allowing the rotary body 28 of the rotary unit 29 to be first suspended on top of two points that are in alignment with, and that are equidistant to the midpoint of the rotary body 28. Thereafter, the unit 29 is allowed to swing about point 210 for a predetermined period of time, for example, one minute (i.e., 60 seconds). As T is 1/F, T therefore can be expressed as 60 seconds/117. Using the above formula, $d_o$ may be expressed as:

$$d_o = \frac{(32.2 \text{ ft/sec}^2) \cdot (60 \text{ sec}/117)^2}{4 \cdot \pi^2}$$

Solving for the equation, the value for $d_o$, which is the relative distance from which the pivot point 212 is located from point 210, is approximately 0.21 feet or 2.58 inches. Since the pivot point 212 of the rotary unit 29 is stationary, i.e., does not move along the longitudinal axis 21, the distance $d_o$ between the pivot point 212 and the point 210 may remain constant regardless of the rotational speed exhibited by the unit. However, it should be appreciated that as different rotary units may exist with measurably different physical dimensions, the value for T, and thus distance $d_o$ may not always be the same between rotary units. This is because the resonant frequency F of a rotary unit is affected by the mass as well as the mass distribution of the system along its longitudinal axis. Thus, for each unit, the frequency F may be different and as a result must be determined on an individual basis.

Once the location of the pivot point 212 has been determined, if the pivot point 212 is within the motor 24, as illustrated in FIG. 2, each of the mounting means 25 is preferably positioned at a level substantially equal in height to the pivot point 212. In this manner, as there is little structure-borne vibration at the pivot point 212 of the rotating system 20, transference of such vibration generated by an unbalanced rotary body 28 to the chassis 22 is minimized. It should be appreciated that after attachment of the mounting means 25 between the motor 24 and the chassis 22 at the level of the pivot point 212, addition of, for example, test tubes to the rotary body 28 does not affect the location of the pivot point 212. This is because the added mass of the test tubes, which may cause an unbalance in the rotary body 28, acts directly on the center of percussion, i.e., the physical origin of unbalance forces, and does not act on the overall mass distribution of the rotary unit 29 to alter the location of the pivot point 212.

As shown in FIG. 2, the mounting means 25 is attached at one of its ends to an exterior surface of the motor 24 and at an opposite end to an interior surface of the chassis 22. Ideally, each of mounting means 25 would have its motor mounting ends be coupled directly to the pivot point 212 within the motor 24. However, because access within the motor 24 may interfere with the operation of the motor, such an attachment of the mounting means 25 is therefore not preferred.

Figure 3:
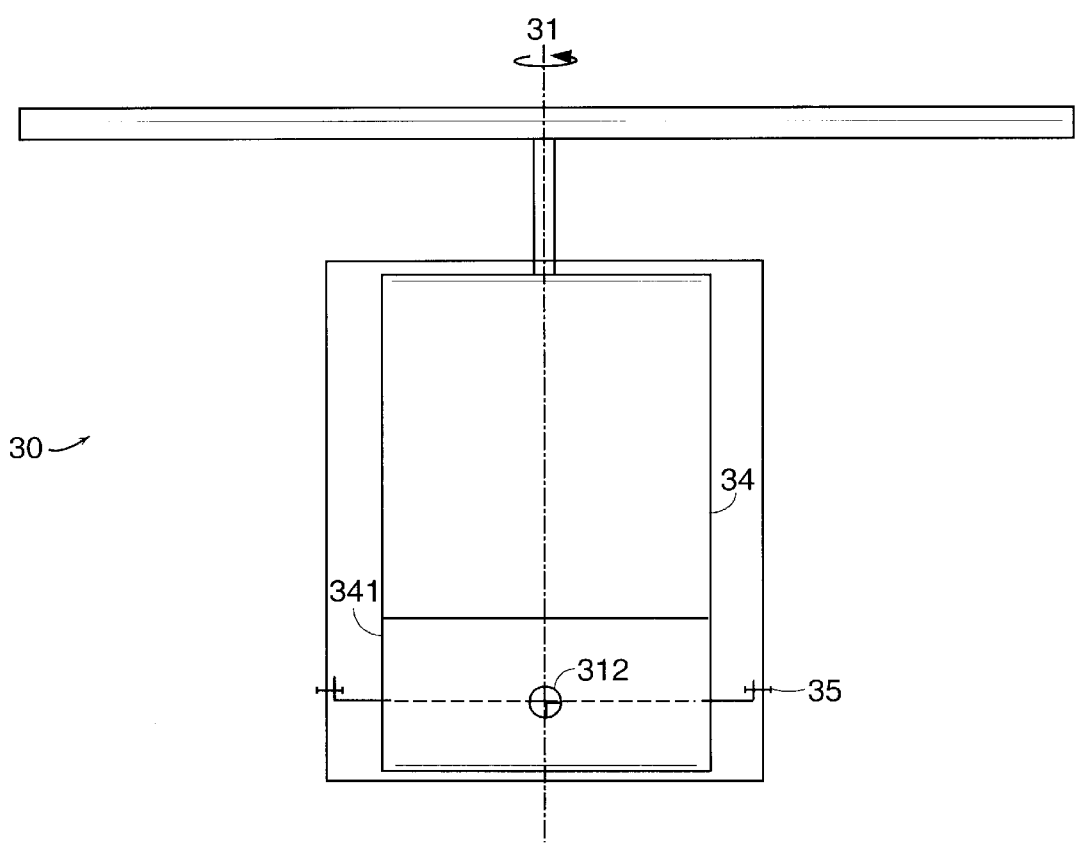
FIG. 3 sbows a rotating system in accordance with another embodiment of the present invention wherein the motor includes extension means to a pivot point outside the motor so that the motor may be attached to the chassis at an area proximate to a pivot point.

Referring now to FIG. 3, a rotating system 30 may have a pivot point 312 calculated to be outside (e.g. below) the motor 34. Such a pivot point, nevertheless, remains along a longitudinal axis 31 of the rotary unit. The existence of pivot point 312 outside the motor 34 may occur when the physical dimensions of rotary unit 39 are such that overall mass and mass distribution of the unit 39 along its longitudinal axis 31 are relatively different than that of the rotary unit 29 seen in FIG. 2. In such a situation, the different mass and mass distribution can lead to a different oscillation period T and thus a different value for $d_o$. In the event that the pivot point 312 is below the motor 34, it is preferable that an extension 341 from the motor 34 to the pivot point 312 be used so that each end of mounting means 35 may subsequently be positioned at a level equal in height to the pivot point 312. Alternatively, the mounting means 35 may be position directly at the pivot point 312 within the extension 341. Extension 341 may be attached to the motor 34 by means well known in the art, for instance, welding, adhesives, or rivets. In a preferred embodiment of the invention, extension 341 is made from a lightweight material so as not to increase further the overall mass and mass distribution of the rotary unit 39. Otherwise, the calculated position of the pivot point 312 may be affected. In addition to being light weight, the material from which the extension 341 is made must also be resilient so as to withstand excessive vibrational stress caused by the rotation of the unit 39. If possible, the material may include vibrational dampening characteristics. To that end, extension 341 may be made from, for instance, titanium, or natural or synthetic rubber.

Figure 4:
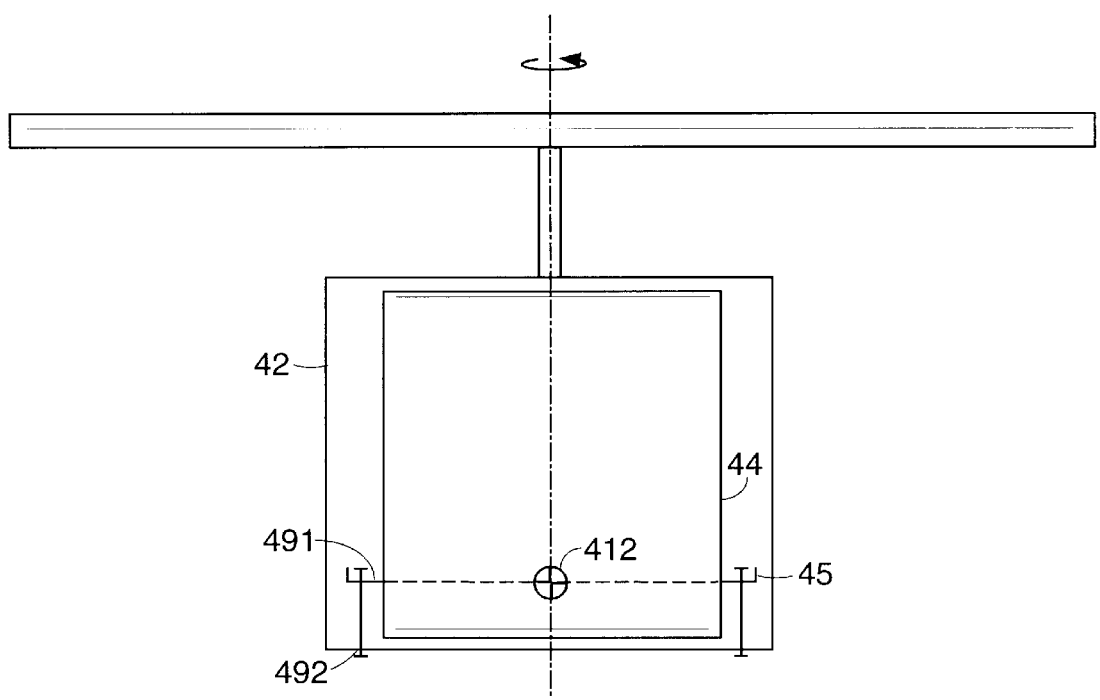
FIG. 4 illustrates an alternate configuration for attaching a motor to a chassis.

FIG. 4 illustrates an alternate embodiment for which mounting means 45 may be positioned between the motor 44 and the chassis 42. As can be seen therein, mounting means 45 may be secured so that while its motor end 491 is attached to the motor 44 at a level equal in height to pivot point 412, its chassis end 492 is positioned on the chassis 42 at a level lower than the pivot point 412. In so far as the points of attachment are not at the same level for both the motor end 491 and the chassis end 492, it is only necessary that the motor end 491 be at a level equal in height to that of pivot point 412 (see FIGS. 2 and 3) where there is essentially little or no vibration. As the motor end 491 is attached to a point with essentially little or no vibration, regardless of the position of the chassis end 492 on chassis 42, structure-borne vibration across the mounting means 45 to the chassis 42 is minimized.

Figure 5:
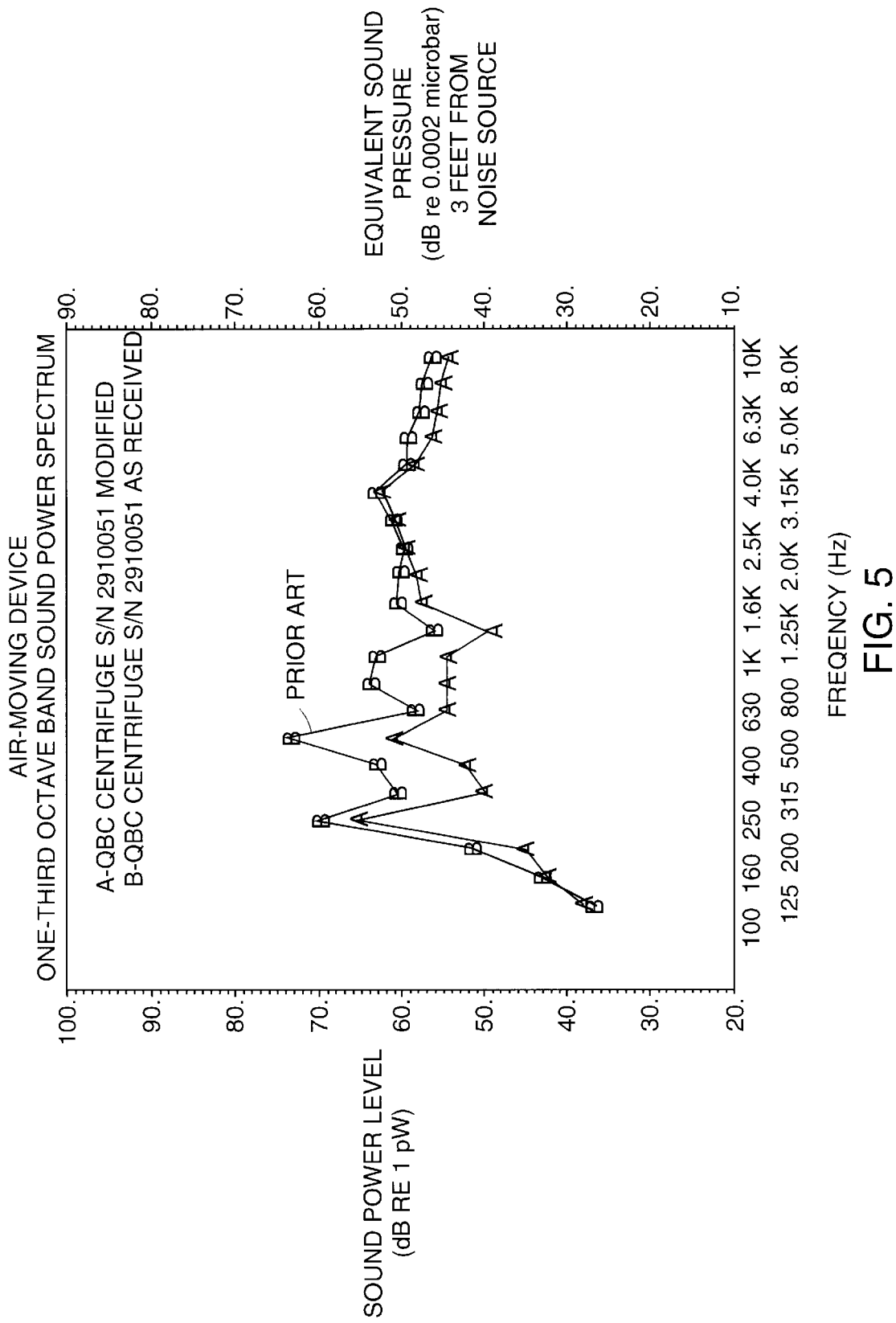
FIG. 5 is a graph showing the results of an acoustic test comparing a prior art rotating system to a rotating system of the present invention.

By minimizing the amount of structure-borne vibration to the chassis 42, offensive acoustics may likewise be minimized. As is explained hereinafter, evidence of decreasing acoustics can be clearly demonstrated in a comparison test which measures the acoustic performance of a modified Becton Dickinson® QBC centrifuge Model Number 424740 S/N 2910051 against a similar unmodified Becton Dickinson® QBC centrifuge. In a modified Becton Dickinson® QBC centrifuge, each of the mounting means has been repositioned so that its motor end and its chassis end are at a level equal in height to the pivot point of the centrifuge, as shown in FIG. 2. The unmodified Becton Dickinson® QBC centrifuge, in contrast, has each of the mounting means positioned away from the pivot point of the centrifuge, as shown in FIG. 1. The test measures the acoustics level for each centrifuge, rotating at 12,000 revolutions per minute (rpm), along a frequency spectrum having a range of from about 100 Hz to about 10 KHz. As shown in FIG. 5, line A represents results from the modified Becton Dickinson® Centrifuge Model Number 424740 S/N 2910051, while line B represents results from the unmodified Becton Dickinson® Centrifuge Model Number 424740 S/N 2910051.

From FIG. 5, it can be seen that from approximately 200 Hz to approximately 2.5 KHz, the range in the level of acoustics for A is noticeably lower than the range in the level of acoustics for B. In particular, the range for A is from about 50 decibels to about 67 decibels, whereas the range for B is from about 55 decibels to about 74 decibels. The difference in decibels between A and B is of particular significance as this illustrates that, in a rotating system similar to a centrifuge, the provision of mounting means at an area proximate to the pivot point (i.e., a level equal in height to that of a pivot point) can indeed lower the acoustics level along a frequency spectrum.

While the invention has been described in connection with specific embodiments thereof, it will be understood that it is capable of further modification. The method for reducing the transference of structure-borne vibration to the chassis of a rotating system and thus the reduction of offensive acoustics in a centrifuge may be applied to other rotating systems. This application therefore is intended to cover any variations, uses, or adaptations of the invention and including such departures from the present disclosure as come within known or customary practice in the art to which the invention pertains.

What is claimed is:

1. A rotating system comprising:
   (a) a chassis having a longitudinal axis;
   (b) a rotary unit having:
      a motor situated within the chassis;
      a shaft having first and second ends and being attached to the motor at the first end; and
      a rotary body placed at the second end of the shaft;
      wherein the rotary unit includes a pivot point, the pivot point remaining at a constant distance from where the rotary body and the second end of the shaft intersect, independent of rotational speed exhibited by the rotary unit, the distance from which the pivot point remains from where the body and the shaft intersect is defined by the formula:

$$d_o = \frac{g \cdot T^2}{4 \cdot \pi^2}$$

wherein g is acceleration due to gravity, and T is an oscillation period of the rotary unit when the unit is allowed to swing about a point of intersection between the rotary body and the shaft; and
   (c) mounting means disposed between the motor and the chassis the mounting means being mounted the distance $d_o$ from the rotary body.

2. A rotating system comprising:
   a chassis;
   a motor situated within the chassis;
   a shaft having a longitudinal axis and first and second ends, the shaft being attached to the motor at the first end;
   a rotary body placed at the second end of the shaft; and
   mounting means disposed between the motor and the chassis and being at a distance $d_o$ from where the rotary body and the second end of the shaft intersect, so that transference of vibratory motion from the motor to the chassis is minimized;
   wherein $d_o$ is defined by the formula:

$$d_o = \frac{g \cdot T^2}{4 \cdot \pi^2}$$

wherein g is acceleration due to gravity, and T is an oscillation period of the motor, the shaft, and the rotary body collectively, when the motor, the shaft, and the rotary body are collectively allowed to swing about a point of intersection between the rotary body and the shaft.

3. A system as set forth in claim 2 wherein the distance $d_o$ extends, from where the rotary body and the second end of the shaft intersect, to within the motor.

4. A system as set forth in claim 3 wherein the mounting means is attached to the motor where the distance $d_o$ terminates.

5. A system as set forth in claim 4 wherein the mounting means, being attached to the motor where the distance $d_o$ terminates, minimizes acoustics produced by the transference of vibratory motion to the chassis.

6. A system as set forth in claim 4 wherein the mounting means is further attached to the chassis at a location directly opposite where the mounting means is attached to the motor.

7. A system as set forth in claim 2 wherein the distance $d_o$ extends, from where the rotary body and the second end of the shaft intersect, beyond the motor.

8. A system as set forth in claim 7 further including means extending from the motor so as to allow the mounting means to be attached to the extending means where the distance $d_o$ terminates.

9. A system as set forth in claim 8 wherein the mounting means, being attached to the extending means where the distance $d_o$ terminates, minimizes acoustics produced by the transference of vibratory motion to the chassis.

10. A system as set forth in claim 8 wherein the mounting means is further attached to the chassis at a location directly opposite the location on the extending means.

11. A system as set forth in claim 2 wherein the motor, the shaft, and the rotary body are concentrically aligned along the longitudinal axis.

12. A rotating system comprising:
    (a) a chassis having a longitudinal axis:
    (b) a rotary unit having:
       a motor situated within the chassis;
       a shaft having first and second ends and being attached to the motor at the first end; and
       a rotary body placed at the second end of the shaft;
       wherein the rotary unit includes a pivot point at which there is less structure-borne vibration than the structure-borne vibration experienced by the unit overall; and
    (c) mounting means disposed between the motor and the chassis and being mounted a distance $d_o$ from the rotary body so that transference of vibratory motion from the motor to the chassis is minimized, the position of the pivot point remaining at a constant distance from where the rotary body and the second end of the shaft intersect independent of rotational speed exhibited by the rotary unit the position of the pivot point being defined by the formula:

$$d_o = \frac{g \cdot T^2}{4 \cdot \pi^2}$$

wherein g is acceleration due to gravity, and T is an oscillation period of the rotary unit when the unit is allowed to swing about a point of intersection between the rotary body and the shaft.

* * * * *